(12) United States Patent
Fleming, Jr. et al.

(10) Patent No.: US 6,553,790 B1
(45) Date of Patent: Apr. 29, 2003

(54) PROCESS FOR FABRICATING OPTICAL FIBER INVOLVING TUNING OF CORE DIAMETER PROFILE

(75) Inventors: James William Fleming, Jr., Westfield, NJ (US); George John Zydzik, Columbia, NJ (US)

(73) Assignee: Fitel USA Corp., Norcross, GA (US)

( * ) Notice: Subject to any disclaimer, the term of this patent is extended or adjusted under 35 U.S.C. 154(b) by 0 days.

(21) Appl. No.: 09/567,536

(22) Filed: May 9, 2000

(51) Int. Cl.$^7$ ............................................. C03B 37/07
(52) U.S. Cl. ........................ 65/382; 65/404; 65/382; 65/391; 65/412; 65/491; 65/102
(58) Field of Search ................... 65/102, 404, 412, 65/382, 391, 491

(56) References Cited

U.S. PATENT DOCUMENTS

| | | | | |
|---|---|---|---|---|
| 4,578,101 A | * | 3/1986 | Clark et al. | 65/108 |
| 4,775,401 A | | 10/1988 | Fleming et al. | |
| 4,820,322 A | * | 4/1989 | Baumgart et al. | 65/412 |
| 5,078,768 A | * | 1/1992 | Aggarwal et al. | 501/40 |
| 5,090,980 A | * | 2/1992 | Clasen | 134/2 |
| 5,240,488 A | | 8/1993 | Chandross et al. | |
| 5,320,660 A | * | 6/1994 | Breuls et al. | 65/109 |
| 5,443,607 A | * | 8/1995 | Englisch et al. | 65/102 |
| 5,702,497 A | * | 12/1997 | Oh et al. | 65/412 |
| 5,735,927 A | * | 4/1998 | Sanghera et al. | 65/36 |
| 5,785,729 A | * | 7/1998 | Yokokawa et al. | 65/102 |
| 5,850,497 A | | 12/1998 | Fleming et al. | |
| 5,861,047 A | | 1/1999 | Fleming et al. | |
| 5,942,019 A | * | 8/1999 | Saito et al. | 65/382 |
| 6,098,428 A | * | 8/2000 | Bogdahn et al. | 65/381 |
| 6,131,415 A | * | 10/2000 | Chang et al. | 65/391 |
| 6,178,778 B1 | * | 1/2001 | Kenmochi et al. | 65/381 |
| 6,220,057 B1 | * | 4/2001 | Yamamura et al. | 65/382 |
| 6,301,934 B1 | * | 10/2001 | Dobbins | 65/381 |
| 6,438,997 B1 | * | 8/2002 | Saito et al. | 65/382 |

FOREIGN PATENT DOCUMENTS

EP          0 737 873 A     10/1996    ............ G02B/6/16

OTHER PUBLICATIONS

Patent Abstracts of Japan, vol. 1995, No. 3, Apr. 28, 1995.
European Search Report dated Aug. 16, 2001 for Application No. 00310291.0–1218.
U.S. patent application Ser. No. 09/436,583, filed on Nov. 9, 1999.

* cited by examiner

Primary Examiner—John Hoffmann

(57) ABSTRACT

A silica-based core rod is traversed by a heat source along its longitudinal axis, to provide heated, softened regions. During the traverse, compressive or tensile movements are provided along the rod's longitudinal axis, these movements inducing, respectively, increases or decreases in the core diameter at the softened regions. By providing selective core diameter increases and/or decreases across the entire length of the core rod, a desired core diameter profile is attained. It is possible to attain a substantially uniform core diameter, or a varying core diameter profile that provides particular properties, such as systematically varying dispersion. In addition, due to the ability to increase core diameter and core rod diameter in a controlled manner, it is possible to make larger core rods, and in turn larger fiber preforms, than presently possible.

11 Claims, 3 Drawing Sheets

PROCESS FOR FABRICATING OPTICAL FIBER INVOLVING TUNING OF CORE DIAMETER PROFILE

BACKGROUND OF THE INVENTION

1. Field of the Invention

The invention relates to fabrication of optical fiber, including fabrication of preforms from which optical fiber is drawn.

2. Discussion of the Related Art

Optical fiber is produced from a glass preform. The preform is generally arranged vertically in a draw tower such that a portion of the preform is lowered into a furnace region. The portion of the preform placed into the furnace region begins to soften, and the lower end of the preform forms what is known as the neck-down region, where glass flows from the original cross-sectional area of the preform to the desired cross-sectional area of the fiber. From the lower tip of this neck-down region, the optical fiber is drawn.

The optical fiber typically contains a high-purity silica glass core optionally doped with a refractive index-raising element such as germanium, an inner cladding of high-purity silica glass optionally doped with a refractive index-lowering element such as fluorine, and an outer cladding of undoped silica glass. In some manufacturing processes, the preforms for making such fiber are fabricated by forming an overcladding tube for the outer cladding, and separately forming a core rod containing the core material and inner cladding material. Overcladding tubes are capable of being formed by a sol-gel process, as discussed, for example, in co-assigned U.S. Pat. No. 5,240,488, or by drawing the tubes from a silica billet—such tubes are available commercially. The core rods are fabricated by any of a variety of vapor deposition methods known to those skilled in the art, including vapor axial deposition (VAD), outside vapor deposition (OVD), and modified chemical vapor deposition (MCVD). MCVD, for example, involves passing a high-purity gas, e.g., a mixture of gases containing silicon and germanium, through the interior of a silica tube (known as the substrate tube) while heating the outside of the tube with a traversing oxy-hydrogen torch. In the heated area of the tube, a gas phase reaction occurs that deposits particles on the tube wall. This deposit, which forms ahead of the torch, is sintered as the torch passes over it. The process is repeated in successive passes until the requisite quantity of silica and/or germanium-doped silica is deposited. Once deposition is complete, the body is heated to collapse the substrate tube and obtain a consolidated rod in which the substrate tube constitutes the outer portion of the inner cladding material. To obtain a finished preform, the overcladding tube is typically placed over the core rod, and the components are heated and collapsed into a solid, consolidated preform, as discussed in co-assigned U.S. Pat. No. 4,775,401.

Optical fiber manufacture has reached a very sophisticated level of development. Yet, in some cases, fiber specifications are so stringent that it is difficult to develop processes capable of meeting such specifications. For example, the properties of many high-end fibers, particularly the dispersion properties, are extremely sensitive to variations in fiber core diameter. In fact, calculations for some commercially-available fiber have shown that as little as a ±1% variation in core diameter induces up to a ±14% variation in dispersion. Due to this dispersion effect, specifications for such fiber generally allow less than ±2% variation in core diameter. With these stringent requirements, it is sometimes difficult to achieve adequate yields in manufacture.

In addition to problems with core diameters, there are numerous fiber designs based on particular core diameter configurations, where the designs are intended, for example, to provide specific dispersion properties. Yet, there are no existing processes that allow production of such fibers in a feasible, commercially-acceptable manner. The designs remain, therefore, primarily theoretical.

Thus, it would be desirable to have a process capable of providing a core rod having substantially uniform core diameter, and, advantageously, also capable of tuning the core diameter profile to provide particular fiber properties.

SUMMARY OF THE INVENTION

The invention relates to a process capable of not only providing a substantially uniform core diameter, but also of tuning the core diameter profile for a particular fiber design. According to the invention, a core rod, typically silica-based, is traversed by a heat source along the rod's longitudinal axis, to provide heated, softened regions. During the traverse, compressive or tensile movements are provided along the rod's longitudinal axis, these movements inducing, respectively, increases or decreases in the core diameter at the softened regions.

In particular, as the heat source traverses the core rod, the source heats discrete regions of the rod above the rod material's softening point. (Softening point indicates the conditions at which the material reaches a viscosity at which it is possible to induce flow, e.g., for silica the softening point generally occurs when the material reaches a viscosity of about $10^{7.6}$ poise.) If the core diameter at the particular region being heated is desirably larger, a compressive movement is applied to expand the diameter of the softened region by viscous flow (the movement expands the diameters of both the core and the overall rod). Alternatively, if the core diameter is desirably smaller, a tensile movement is applied to stretch that softened region and thereby reduce the core diameter (and overall rod diameter), again by viscous flow. These compressive and/or tensile movements are continued, and varied in degree to provide the appropriate diameter expansion or contraction, as the heat source traverses the core rod. As the heat source moves past the region, the diameter adjustments are essentially locked in place upon cooling. It is then possible to form a fiber preform containing the resultant rod by conventional techniques, and to draw fiber therefrom.

By providing selective core diameter increases and/or decreases across the entire length of the core rod, a desired core diameter profile is attained. For example, it is possible to attain a substantially uniform core diameter, e.g., where the core diameter over at least 90%, optionally 100%, of the rod length is within 0.2% of the average core diameter, optionally within 0.1%. It is also possible to provide varying core diameter profiles to provide particular properties, such as systematically varying dispersion. For example, future systems may employ fiber having pre-selected dispersion variations over a particular transmission length, in order to reduce non-linearities. In addition, the ability to increase core diameter and core rod diameter in a controlled manner makes fabrication of larger core rods possible, which in turn makes larger fiber preforms possible, e.g., preforms capable of providing at least 1200 km, or even 2400 km, of 125 µm diameter fiber.

DETAILED DESCRIPTION OF THE INVENTION

Figure 1:
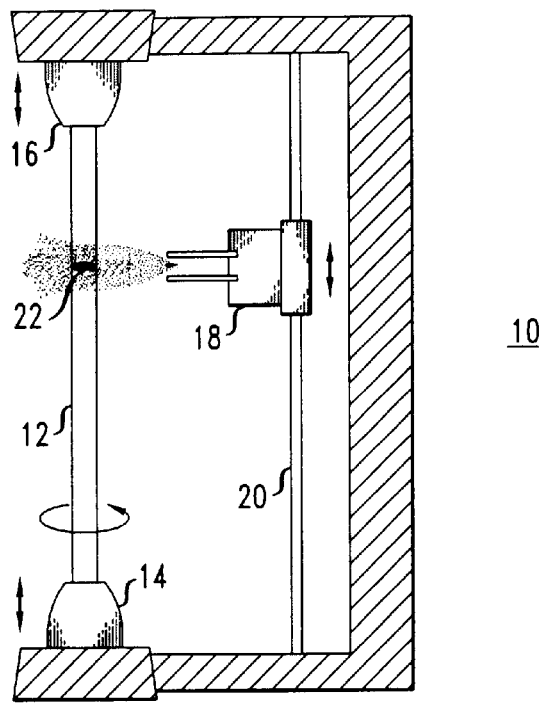
FIG. 1 illustrates an apparatus suitable for performing an embodiment of the invention.

FIG. 1 illustrates an apparatus 10 suitable for practicing an embodiment of the invention. A core rod 12 is held by two chucks 14, 16. The chucks 14, 16 are capable of rotating the rod 12, and at least one of the chucks, optionally both, is capable of providing tensile and compressive movement along the direction of the longitudinal axis of the rod 12. A heat source 18 is provided, the heat source 18 capable of traversing the length of the rod, e.g., along a guide 20, such that discrete heated portions of the rod 22 are provided. (The heat source traverse discussed herein is not intended to indicate that the heat source itself must move along the rod, but indicates any technique by which the source moves relative to the rod, including movement of the heat source, of the rod, or of both the source and the rod.)

The core rod 12 is formed by any suitable technique known to those skilled in the art, e.g., outside vapor deposition (OVD), vapor axial deposition (VAD), or modified chemical vapor deposition (MCVD). The rod is generally silica-based, but other materials suitable for making optical fiber are also possible. It is similarly possible for the rod to have any desired dopant/refractive index profile.

The heat source 18 is any source capable of heating the rod above the material's softening point. Typically, the source is an isothermal plasma torch, e.g., as described in co-assigned U.S. Pat. No. 5,861,047. A useful plasma comprises oxygen, e.g. pure oxygen or oxygen and an inert gas such as argon.

The original core profile of the rod is generally determined prior to heating, as a function of position along the rod length (although it is contemplated that the core profile measurement and heat treatment could be performed together, e.g., the profile measurement apparatus traverses the rod ahead of a heat source). The profile is generally determined by measuring the refractive index profile, e.g., by use of a PK Technology preform profiler. The diameter is generally measured at a sufficient number of points to reasonably reflect the overall profile, with the particular number of points depending on the particular application and the desired accuracy of the treatment. Typically, this core profile information is directly input into a computer. Based on the profile, it is possible to determine what adjustments are necessary in the core diameter profile, and more importantly, where those adjustments are necessary, in order to attain a desired profile. These adjustments are typically able to be calculated and/or input in the same computer.

Once the core profile is determined, the heat treatment is initiated. During the traverse, the source 18 heats localized regions 22 of the rod above the softening point of the rod material, which typically ranges from about 1500 to about 2400° C. for silica, with some variation depending on the type and extent of doping. Typically, these localized regions constitute about 2 to about 10 mm (measured along the longitudinal axis) of the rod, depending on the heat source type and the apparatus configuration.

While these regions 22 are in a softened state, it is possible to adjust the diameter of the core (along with the overall rod diameter) by applying a compressive or a tensile movement. Specifically, a compressive movement will increase the core and rod diameter, by increasing the volume (through viscous flow) within a particular length of the rod. Similarly, a tensile movement will reduce the core and rod diameter, by reducing the volume (again by viscous flow) of material within a particular length of the rod. The compressive and tensile movements are performed by movement of one or both of the chucks 14, 16 relative to the other. The extent and type (compressive vs. tensile) of movement is generally controlled by a computer, based on a comparison of the pre-treatment profile to the desired profile. Thus, as the heat source 18 traverses the rod 12, it is possible for continual tensile and/or compressive movements to be applied, to provide the desired profile. It is also possible for no longitudinal movement to be applied, e.g., if the core at a particular heated region 22 is already of the desired diameter.

Advantageously, the rod is arranged such that the longitudinal axis is substantially vertical. This vertical arrangement reduces or eliminates the ability of gravity to affect the softened, viscous regions of the rod in a non-uniform manner. Without the vertical arrangement, gravity has the potential to make the rod axially non-true and/or to cause bending of the finished rod. Generally, the rod is rotated during the heating to improve the uniformity of the heating. For a plasma torch, a core rod rotation of 10 to 30 rpm is typical. A typical traverse rate for a plasma torch is 1 to 10 cm/minute for a rod diameter of 15 to 30 mm (generally, the larger the rod diameter, the slower the traverse rate, since thicker rods require more heating).

For an embodiment of the type illustrated in FIG. 1, but in which (a) only the upper chuck 16 is capable of tensile/compressive movement, and (b) the torch 18 traverses the rod at a downward velocity, the core diameter profile is adjusted, as follows. The torch is traversed along the longitudinal axis of the rod at a velocity, $v_t$, and the top chuck is moved (along the direction of the rod's longitudinal axis) at a velocity, $v_c$, according to:

$$v_c = v_t (1-(d_c/d_d)^2) \qquad (1)$$

where $d_c$ is the initial core diameter at a particular region prior to heating, and $d_d$ is a desired core diameter at that region. The velocity, $v_c$, is either positive or negative, depending on whether compressive or tensile movement is required. For other embodiments, development of similar algorithms is within the skill of an ordinary artisan, based in the guidelines herein.

The core diameter adjustment also changes the outer diameter of the rod itself. However, because the rod is being placed into an overcladding tube of substantially larger diameter, and then collapsed into a preform, the effect of rod diameter variations are relatively small. For example, a change in rod diameter of several percent is typically reduced in effect by two orders of magnitude when placed into an overcladding tube. In addition, if desired, it is possible to remove some of this excess material from the outside of the rod. It is possible to perform such removal during the core diameter adjustment, e.g., by holding the torch at a particular location such that some exterior material is etched, or by another pass of the heat source. It is also possible to perform an etch of the entire rod, again during or after the core diameter adjustment.

The core diameter adjustment technique is useful for attaining a relatively uniform core diameter profile.

Specifically, it is possible to attain a profile in which the core diameter over at least 90%, optionally 100%, of the rod length is within 0.2% of the average core diameter, optionally within 0.1%. The entire length of the rod is generally able to be treated by attaching handles to the ends of the rod, with the handles then inserted into the chucks. This substantial uniformity provides desirable fiber properties, including improved dispersion properties.

Also, current processes for making core rods generally limit the attainable core rod diameter. As a result, the final preform size is similarly limited. However, because the invention makes it possible to increase core diameter and core rod diameter in a controlled manner, e.g., by providing controlled compressive movements during heating, it is possible to make larger core rods. Such larger core rods in turn allow fabrication of larger fiber preforms, e.g., preforms capable of providing at least 1200 km, optionally at least 2400 km, of 125 µm diameter silica fiber.

It is also possible according to the invention to provide specific core diameter profiles to provide particular properties, e.g., particular dispersion characteristics. For example, there exist various fiber designs that currently are not capable of being fabricated at all or are not capable of being fabricated with acceptable yields, and the invention will enable fabrication of such designs in an efficient manner. One such design is constant-dispersion fiber, as reflected in Examples 3 and 4 below. It is expected that the invention will make it possible to efficiently produce fiber exhibiting substantially constant dispersion, i.e., dispersion varying from the average dispersion by about 0.5 ps/nm-km or less.

The invention will be further clarified by the following examples, which are intended to be exemplary.

EXAMPLE 1

A silica-based core rod fabricated by an MCVD process was obtained.

The core diameter of the rod was measured by determining the refractive index profile, at 1 cm increments along the rod, at a single angular position along the rod. The rod was placed vertically into a plasma torch apparatus similar to FIG. 1 after the core diameter measurement, by securing the top and bottom of the rod in chucks capable of providing rotation around the rod's longitudinal axis. The top chuck was capable of providing movement along the longitudinal axis of the rod. Based on the measured profile, the tensile and/or compressive movements required to attain a uniform 3.21 mm core diameter were calculated according to Equation 1 above. These motions were input into the plasma torch control computer, and the treatment was begun. The rod was rotated at about 30 rpm. The plasma torch ran an oxygen plasma at 50 kW, and traversed the rod at a velocity of about 6 cm/minute.

Figure 2:
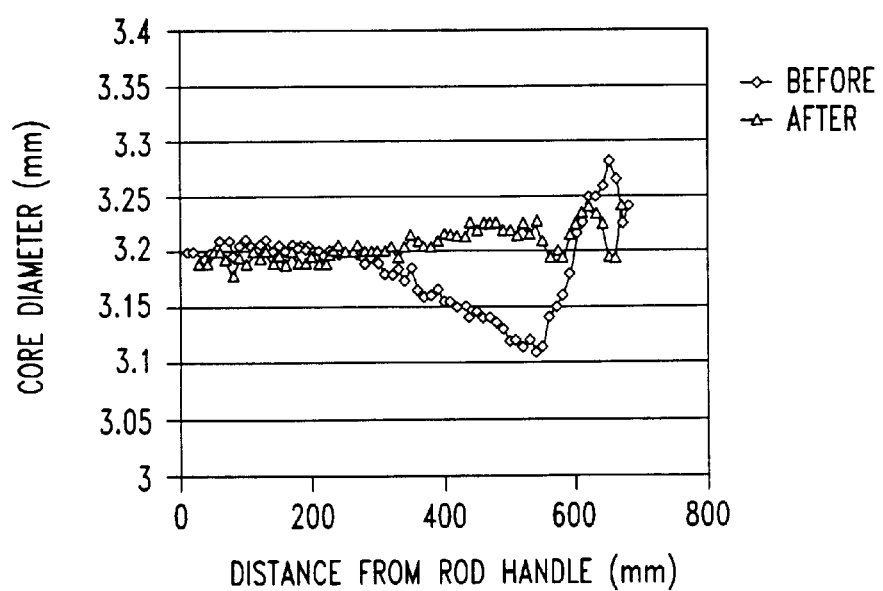
FIG. 2 illustrates adjustment of a core diameter profile according to an embodiment of the invention.

The core diameter profile of the rod before and after the treatment is shown in FIG. 2. The treatment substantially improved the uniformity of the core diameter.

EXAMPLE 2

Figure 3:
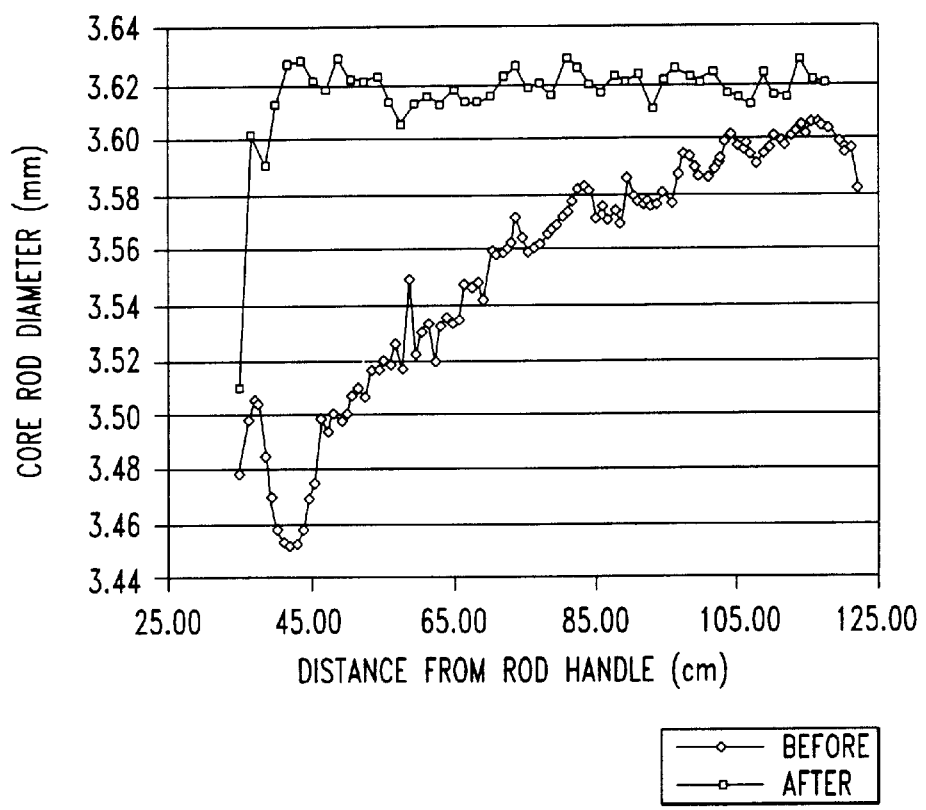
FIG. 3 illustrates adjustment of a core diameter profile according to an embodiment of the invention.

The process of Example 1 was performed, with the tensile and/or compressive movements calculated to provide a uniform 3.62 mm rod diameter. The core diameter profile of the rod before and after the treatment is shown in FIG. 3.

EXAMPLE 3

Figure 4:
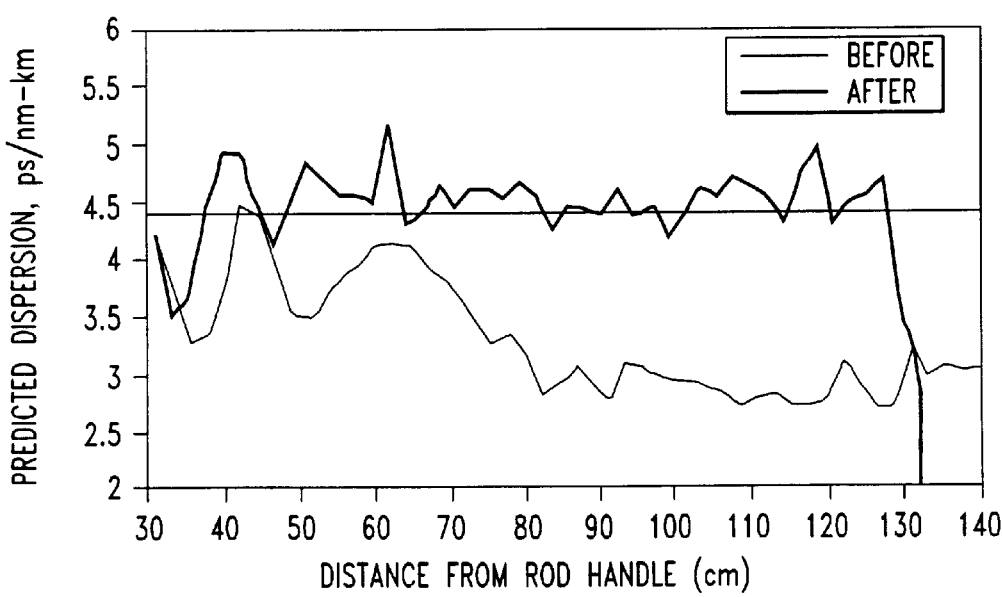
FIG. 4 illustrates the effect of an embodiment of the invention on fiber dispersion properties.

The process of Example 1 was performed, but the compressive and tensile movements were calculated, based on computer modeling, such that the core would result in a fiber having constant dispersion. The dispersion characteristics of fiber that would result from the core diameter profile before and after the diameter adjustment were calculated, and the results are shown in FIG. 4.

EXAMPLE 4

Figure 5A:
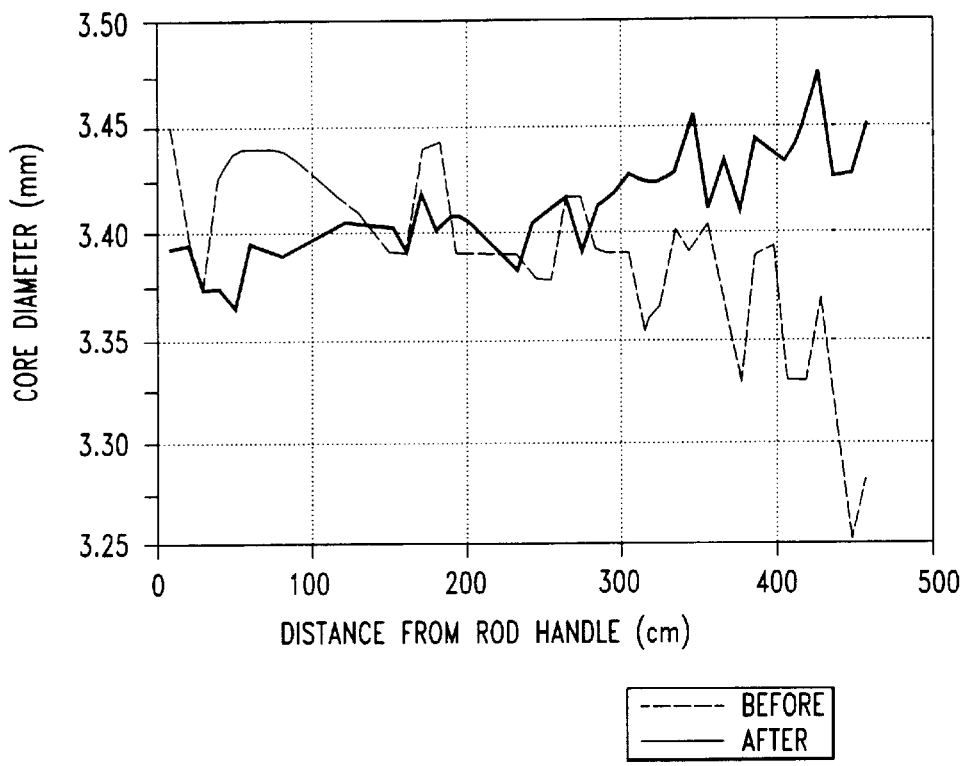
FIGS. 5A and 5B illustrate adjustment of core diameter profile and the effect of an embodiment of the invention on fiber dispersion properties.
Figure 5B:
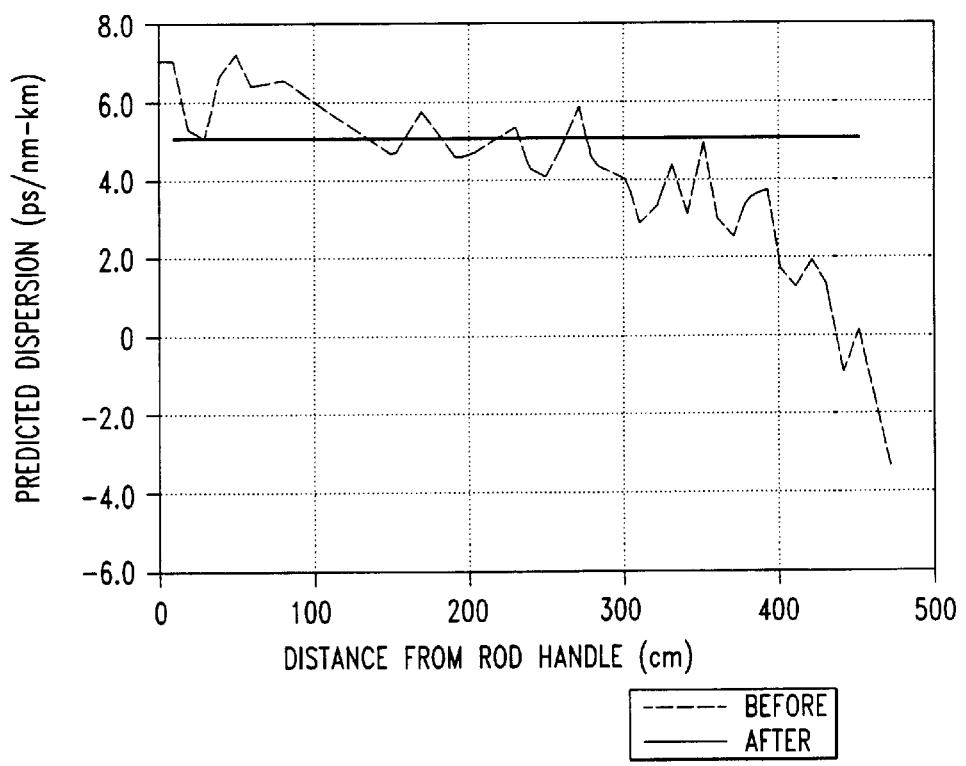

The process of Example 3 was repeated, with the compressive and tensile movements calculated, based on computer modeling, such that the core would result in a fiber having constant dispersion. FIG. 5A shows the core diameter profile before and after the diameter adjustment. FIG. 5B shows the calculated dispersion. As can be seen, after core diameter profile adjustment, the calculated dispersion is substantially constant.

Other embodiments of the invention will be apparent to those skilled in the art from consideration of the specification and practice of the invention disclosed herein.

What is claimed is:

1. A process for fabricating an article, comprising the steps of:

providing a core rod comprising a core portion along the length thereof;

determining the original core profile of the rod as provided by measuring the rod diameter at a plurality of points along the length thereof;

determining adjustments required to predetermined portions of said core rod to attain a desired core profile;

traversing a heat source along the longitudinal axis of said core rod such that discrete portions of said rod are heated to the softening point; and adjusting the diameter of appropriate discrete portions of said softened rod by applying compressive or tensile movement to modify the original core profile into the desired core profile.

2. The process of claim 1, wherein the heat source is an isothermal plasma torch.

3. The process of claim 2, wherein the plasma comprises oxygen.

4. The process of claim 1, wherein the adjusting step comprises the steps of:

heating a first discrete portion of the rod while providing a compressive movement along the longitudinal axis of the rod, wherein the movement induces an increase in the core diameter at said first discrete portion; and heating a second discrete portion of the rod, before or after heating the first discrete portion, while providing a tensile movement along the longitudinal axis of the rod, wherein the movement induces a decrease in the core diameter at the second discrete portion.

5. The process of claim 1, wherein, subsequent to the traverse, the core diameter over at least 90% of the rod length varies less than 0.2% from the average core diameter of the rod.

6. The process of claim 1, wherein a first end of the rod is secured by a first chuck and a second end of the rod is secured by a second chuck, and wherein the first chuck, the second chuck, or both the first chuck and the second chuck are capable of providing the compressive or tensile movement along the longitudinal axis of the rod.

7. The process of claim 1, wherein the rod is arranged such that the longitudinal axis of the rod is in a substantially vertical position during the traversal step.

8. The process of claim 1, further comprising the steps of:

subsequent to the traverse, inserting the core rod into an overcladding tube; and collapsing the tube onto the rod to form an optical fiber preform, the preform capable of producing at least 1200 km of 125 μm diameter optical fiber.

9. The process of claim 8, wherein the preform is capable of producing at least 2400 km of 125 μm diameter optical fiber.

10. The process of claim 1, wherein the core rod is a silica-based core rod.

11. The process of claim 1, further comprising the steps of:

subsequent to the traverse, inserting the core rod into an overcladding tube;

collapsing the tube onto the rod to form an optical fiber preform; and drawing optical fiber from the preform.

* * * * *